Oct. 3, 1950

C. MOTT 2,524,231

PRESSURE REGULATOR FOR HIGH-PRESSURE OXYGEN

Filed Feb. 9, 1946

INVENTOR
*Chester Mott*
BY
*Dean Fairbank & Hirsch*
ATTORNEYS

Patented Oct. 3, 1950

2,524,231

UNITED STATES PATENT OFFICE 2,524,231

PRESSURE REGULATOR FOR HIGH-PRESSURE OXYGEN

Chester Mott, Evanston, Ill., assignor to National Cylinder Gas Company, Chicago, Ill., a corporation of Delaware Application February 9, 1946, Serial No. 646,526

4 Claims. (Cl. 50—23)

This invention is an improvement in that type of gas pressure regulators employed for reducing and controlling the flow of oxygen gas from a high pressure tank, and wherein the flow of gas is controlled by a valve member and a valve seat moved relatively to each other by the action of a yieldingly spring-pressed diaphragm to maintain a predetermined gas delivery pressure. A spring or gas pressure acting on one side of the diaphragm counteracts the gas pressure on the other side to keep the valve open to such extent as will maintain the delivery at the desired pressure. In order that a gas-tight seal may be effected when the valve parts are in engagement with the nozzle, it is customary to make the seat of a small block or pad of non-porous resilient material. Most of such resilient materials are, at least to some extent, combustible.

Pressure regulators of this kind are commonly employed for controlling the delivery of oxygen from a high pressure gas tank, which may be under pressure up to about 2400 pounds per square inch, and when not in use the seat is pressed against the valve by an auxiliary spring, and the gas is shut off at the tank by a hand controlled valve. The desired working pressure may be from 1 pound to 200 pounds per square inch and should be maintained constant regardless of the pressure in the tank. When it is desired to start operation, the valve on the high pressure tank is opened, but if it be rapidly opened, it not infrequently happens that the gas rapidly flowing to the closed seat and being there suddenly stopped, a sufficient recompression occurs at the valve seat of the diaphragm valve to develop sufficient heat in the nozzle adjacent to said seat to cause ignition of any fine dust that may be in the nozzle or on the seat, and burning or charring of the combustible material forming the valve seat. This results in danger to the operator and necessitates long delay in removing the regulator, taking it apart, and installing a new seat.

It will be understood that this very rapid flow and sudden recompression at the seat which may cause the momentary and instantaneous development of heat, is not very likely to occur under many conditions of operation. For instance, when the oxygen of the supply tank has been partly used up and the gas pressure in the tank has been lowered below about 1400 pounds; or when the passage from the tank valve to the diaphragm controlled valve is restricted so as to offer resistance to and slowing down of the gas flow; or when the tank valve is opened very slowly to cause a slow build up of pressure with any recompression taking place at a slower rate; or when the pressure regulator valve seat is very smooth and free from dust particles.

It will also be understood that operators very seldom take regulators apart to ascertain the smoothness or cleanliness of the seat, and are careless as to the speed at which they open the tank valve when a fresh cylinder containing oxygen under 2000 pounds or more pressure per square inch is put into use, also that in some cases the pressure regulator is not mounted on the tank close to the hand operated tank valve.

The main objects of the present invention are to prevent the liability of seat ignition under all likely conditions of use, and to make the regulator foolproof so far as concerns seat ignition. These objects are accomplished by incorporating in the high pressure oxygen line, and preferably in the intake passage of the regulator, a flow impeder having certain definite characteristics.

In carrying out my invention I employ a flow impeder which is non-combustible and preferably of sintered bronze or other non-ferrous metal, and formed from powdered metal by powder metallurgy. It is sufficiently porous to permit the gases to flow therethrough at a rate high enough under the lowest normally usable oxygen pressure in the cylinder for proper operation of the apparatus in which the gas is used, such for instance as in a cutting or welding torch, but at the same time its resistance to the flow of gases therethrough is sufficiently high to slow down the rate of flow to a rate below that at which recompression at the diaphragm valve will cause excessive temperature to develop at the valve seat or disc when the tank is under high pressure and the valve is opened rapidly.

For the usual type of gas pressure regulators for compressed oxygen, the flow impeder is a diaphragm preferably formed of metal particles of a size and so spaced that dust or other particles between .0005 and .001 inch cannot pass through, and it preferably has a porosity of about 50%. Such a flow impeder may have a density of about .16 pound per cubic inch.

It is preferably of such a size and shape that it may be installed in the intake passage of a standard gas pressure regulator, without machining or otherwise altering the regulator, although in some regulators it may be necessary to slightly enlarge a portion of the intake passage by reaming it out to receive the flow impeder, and to provide a narrow seat for the latter.

As a specific example, the flow impeder may be in the shape of a hollow cone having a length of about ⅞ of an inch, an outside diameter of about 7/16 of an inch at the base of the cone, an inside diameter at the base of the cone of about ¼ of an inch, a diameter at the small end of about 1/16 of an inch, and a wall thickness of about 1/16 of an ich.

The device does not act as a flame arrester, but as a flow impeder or flame preventer, and it does not serve as a filter, except in a very minor and incidental way in preventing dust from being carried to the valve seat with the oxygen gas. It acts as a flow impeder for high speed flow, but has negligible effect on a low speed flow. By "low speed flow" is meant that flow necessary to supply sufficient oxygen to a cutting or welding torch or other apparatus to which the pressure regulator delivers the oxygen, and under the pressure used in such apparatus. By making the flow impeder hollow, of conical shape and open at the base end there is provided a large surface area in respect to the maximum outside diameter so that it may be inserted in the regulator intake passage, which in practice is usually not over ½ of an inch in diameter.

The porosity required will vary with the dimensions of the flow impeder, but for the dimensions above given a porosity of substantially less than 50% may interfere with the supply of oxygen at the desired rate and under the desired pressure to the apparatus connected with the regulator when the pressure in the supply tank is low; and a porosity substantially greater than 50% may under some circumstances permit such rapid flow through the flow impeder to the valve seat as to cause a dangerous rate of recompression, heating and ignition, when the oxygen supply tank is under very high pressure and the tank valve is opened rapidly.

Figure 1:
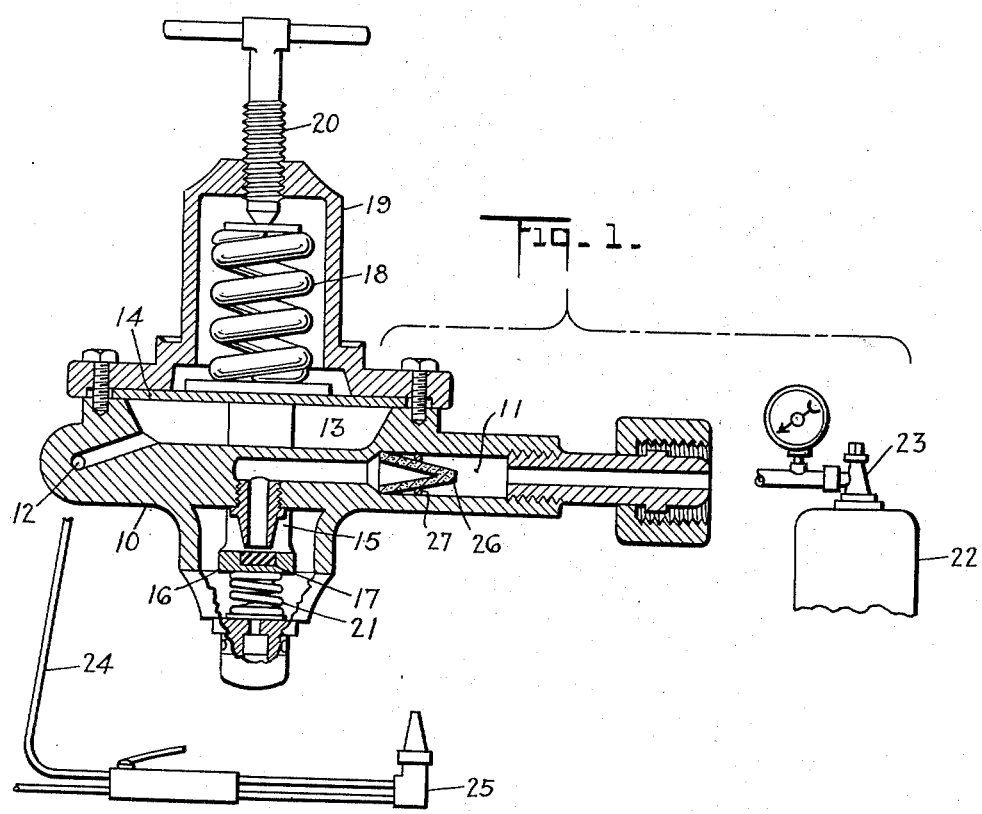
Fig. 1 is a central longitudinal section through a standard form of pressure regulator, and including my improved flow impeder, and showing, diagrammatically, a high pressure tank, a torch, and piping connections.

As shown, the pressure regulator has a main casing section 10 with an inlet passage 11, a delivery passage 12, and a chamber 13, closed at the top by a diaphragm 14. The inlet passage terminates in a nozzle 15, and in the chamber 13 there is a yoke 16 secured to or abutting against the diaphragm and carrying a valve seat 17 for engagement with the end of the nozzle 15. Obviously the parts may be reversed, and the seat be stationary and the valve be moved by the diaphragm. Either an adjustable spring 18 is housed in a top casing section or cap 19, to press down on the diaphragm, or the casing may provide a gastight chamber to which a gas under desired pressure may be delivered to press the diaphragm downwardly. A screw 20 extends through the cap and engages the spring for varying the pressure exerted by the spring on the diaphragm.

When the regulator is not in use, the tension on the spring is released, and the valve seat 17 is held against the end of the nozzle or valve 15 by a small spring 21.

The inlet passage 11 is connected to a high pressure storage tank 22, and in the connection between the tank and the inlet passage 11 of the regulator there is provided a tank valve 23. In practice the pressure regulator is usually mounted on the tank and closely adjacent to the tank valve. The delivery passage 12 of the regulator is connected by a hose 24 to a torch 25, or to other apparatus in which oxygen is to be used, or to which it is to be delivered under controlled pressure very much lower than that in the supply tank.

Upon opening the tank valve 23, the high pressure oxygen rushes into the inlet passage 11 of the regulator and is suddenly stopped at the valve seat which is held against the nozzle by the spring 21. The operator then turns the screw 20 to compress the spring 18, overcome the pressure of the spring 21, and move the seat from the nozzle. The oxygen then flows into the chamber 13, acts on the diaphragm to partially lift the valve seat, and compresses the spring 18. This spring is adjusted to the desired extent so that the required gas pressure will act on the diaphragm to hold the valve open to such an extent as will maintain the given gas pressure in the chamber 13 and in the hose 24 leading to the torch.

As previously stated, the sudden opening of the tank valve, the resulting high velocity of oxygen flow through the passage 11, and the sudden stopping of the flow at the seat 17 causes recompression of the oxygen in the nozzle at the seat, and this results in the development of a high temperature, which is often sufficient to cause ignition of fine particles of lint or dust in the nozzle, and burning or charring of the seat.

Figure 2:
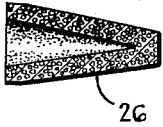
Fig. 2 is a longitudinal section through the flow impeder.
Figure 3:
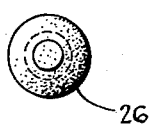
Fig. 3 is an end view thereof.

To prevent this I employ, as an important feature of my invention, a flow impeder 26 in the intake passage 11. This is shown on an enlarged scale in Figs. 2 and 3. It constitutes a rigid diaphragm, which is preferably of hollow conical form and composed of sintered metal powder, as heretofore described, and has its base end seated on a shoulder in the inlet passage 11 facing away from the nozzle so that the oxygen pressure holds the conical diaphragm against the seat. A small ring 27 or other suitable means may engage the conical surface and the inner surface of the passage 11 so as to prevent movement of the impeder away from the seat during the handling of the pressure regulator.

By making this flow impeder of metal particles with interstitial spaces of a size between .0005 and .001 inch, and with a porosity of about 50%, the high velocity flow of the oxygen, when the tank valve is opened, will be reduced to a limited extent, and sufficient to so limit the time rate of recompression at the valve seat upon the sudden opening of the tank valve, as to prevent the development of a temperature sufficiently high to cause any ignition. At the same time the resistance to flow of the oxygen through the flow impeder is not sufficient to prevent the maximum rate of flow required for the torch, or other apparatus in which the oxygen is being utilized.

Having thus described my invention, what I claim as new and desire to secure by Letters Patent is:

1. A gas pressure regulator for high pressure oxygen, including a casing having a diaphragm, a high pressure inlet passage, a valve, and a valve seat, one stationary and the other movable with said diaphragm, and a porous diaphragm of non-combustible material in said inlet passage and spaced from said valve seat, the porosity of said diaphragm being sufficient to permit normal flow of oxygen without substantial pressure drop during normal operation, but insufficient to permit such rapid flow upon sudden opening of a high pressure oxygen supply valve as will produce recompression and high heat production at said valve seat.

2. A gas pressure regulator for high pressure oxygen, including a casing having a diaphragm, a high pressure inlet passage, a valve, and a valve seat, one movable with said diaphragm for seating engagement with the other, and a porous sintered non-ferrous metal flow impeder in said inlet passage and having interstitial spaces of a size between about .0005 and .001 inch, and a porosity of about 50%.

3. A gas pressure regulator for high pressure oxygen, including a casing having a diaphragm, a high pressure inlet passage terminating in a nozzle, a valve seat operatively connected to said diaphragm for seating engagement with said nozzle, and a porous sintered non-ferrous metal flow impeder in said inlet passage, and in the form of a hollow cone, formed of metal particles with interstitial spaces between about .0005 and .001 inch, and a porosity of about 50%.

4. In combination a high pressure oxygen source, a control valve, and a gas pressure regulator, including a casing having a diaphragm, a high pressure inlet passage terminating in a nozzle, a valve seat of combustible material operatively connected to said diaphragm for seating engagement with said nozzle, and a porous diaphragm of non-combustible material in said inner passage, the porosity of said diaphragm being sufficient to permit the normal flow of oxygen without substantial pressure drop during normal operation, but insufficient to permit such rapid flow upon sudden opening of said control valve as will produce a rate of recompression at said valve seat sufficient to cause the production of sufficient heat to cause charring of the valve seat.

CHESTER MOTT.

REFERENCES CITED

The following references are of record in the file of this patent:

UNITED STATES PATENTS

| Number | Name | Date |
| --- | --- | --- |
| 1,687,780 | Neale | Oct. 16, 1928 |
| 1,825,637 | Ricker | Sept. 29, 1931 |
| 2,297,817 | Truxell | Oct. 6, 1942 |
| 2,359,386 | Reinsch | Oct. 3, 1944 |
| 2,360,634 | Allen | Oct. 17, 1944 |